United States Patent [19]

Alkofer

[11] Patent Number: 4,642,684

[45] Date of Patent: Feb. 10, 1987

[54] METHOD AND APPARATUS FOR DETECTING AND PRINTING COLOR PHOTOGRAPHIC IMAGES OF SCENES EXPOSED WITH NARROW BAND ILLUMINANT

[75] Inventor: James S. Alkofer, Hamlin, N.Y.

[73] Assignee: Eastman Kodak Company, Rochester, N.Y.

[21] Appl. No.: 730,626

[22] Filed: May 6, 1985

[51] Int. Cl.$^4$ .................. G03F 3/08; H04N 1/46; G03B 27/80

[52] U.S. Cl. ........................... 358/80; 358/75; 355/38

[58] Field of Search .............. 358/75, 76, 78, 80, 358/280, 283, 284, 256; 382/18; 355/38, 35, 40, 41, 77, 88, 68

[56] References Cited

U.S. PATENT DOCUMENTS

| 4,101,217 | 7/1978 | Fergg et al. | 355/38 |
| 4,120,591 | 10/1978 | Takahashi et al. | 355/38 |
| 4,168,121 | 9/1979 | Freier et al. | 355/38 |
| 4,203,671 | 5/1980 | Takahashi et al. | 355/77 |
| 4,244,653 | 1/1981 | Asai et al. | 355/38 |
| 4,339,517 | 7/1982 | Akimoto | 355/38 |
| 4,410,909 | 10/1983 | Ueda et al. | 358/78 |
| 4,467,364 | 8/1984 | Konagaya | 358/76 |
| 4,472,736 | 9/1984 | Ushio et al. | 358/75 |
| 4,492,458 | 1/1985 | Bickl et al. | 355/38 |
| 4,566,786 | 1/1986 | Fürsich et al. | 355/38 |

FOREIGN PATENT DOCUMENTS

| 88042 | 7/1980 | Japan | 355/38 |
| 88043 | 7/1980 | Japan | 355/38 |

OTHER PUBLICATIONS

"Automatic Color Printing Techniques," by J. Hughes and J. K. Bowker; Image Technology, Apr./May, 1969, pp. 39-43.

Primary Examiner—James J. Groody
Assistant Examiner—Randall S. Svihla
Attorney, Agent, or Firm—Thomas H. Close

[57] ABSTRACT

In automatic color printing, there is a need to identify scenes that have been exposed with a very narrow-band illuminant and to apply no color correction to such scenes. Narrow-band illuminant scenes are identified according to the present invention by scanning the original image in three primary colors to generate three color value distributions. The statistics of the three color value distributions are computed, and if the ratio of the standard deviations for any two of the color value distributions is greater than a first predetermined constant (e.g. 4.0) or less than a second predetermined constant (e.g. 0.25), no color correction is employed. The method is particularly useful in a scanning color photographic printer employing histogram modification to effect tone-scale and color balance adjustments.

9 Claims, 9 Drawing Figures

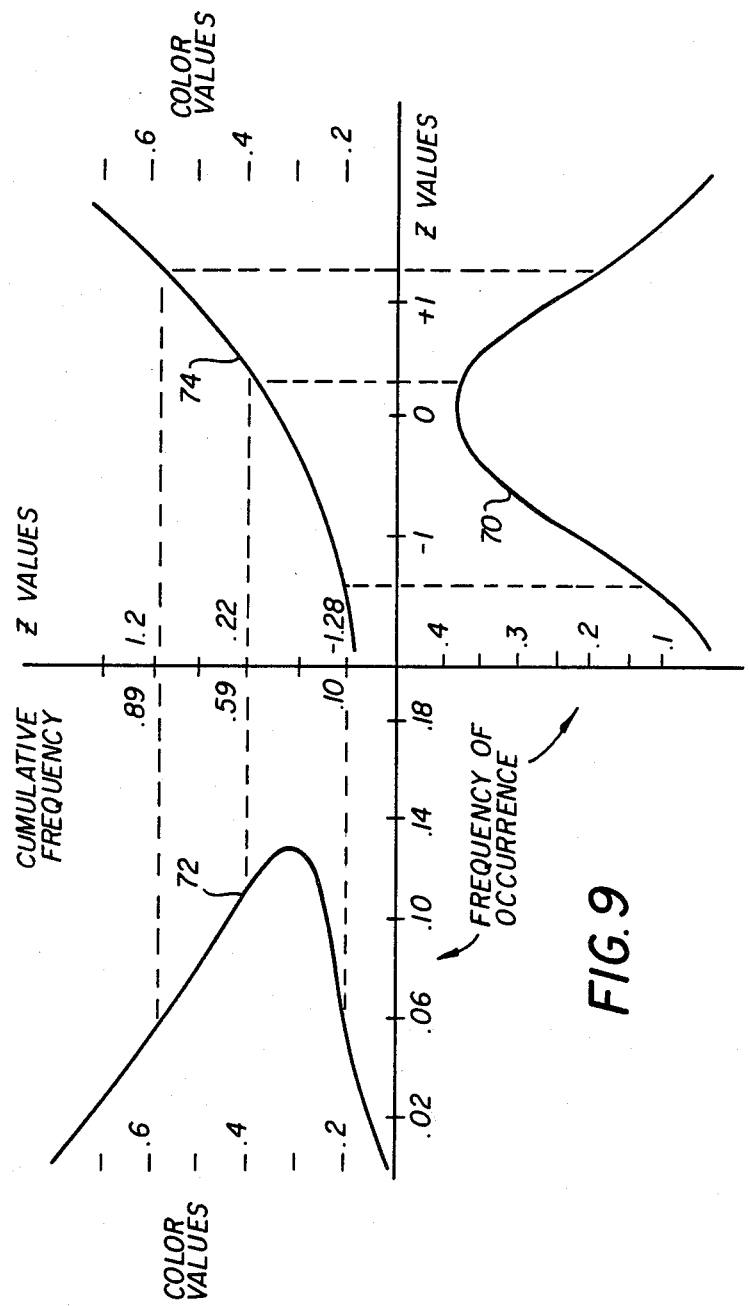

METHOD AND APPARATUS FOR DETECTING AND PRINTING COLOR PHOTOGRAPHIC IMAGES OF SCENES EXPOSED WITH NARROW BAND ILLUMINANT

TECHNICAL FIELD

The invention relates to color printing, and more particularly to a method for automatically detecting an image of a scene exposed by a narrow-band illuminant, and for automatically adjusting the color correction in a photographic printer in response thereto.

BACKGROUND ART

In photographic color printing, it is a well known practice to "correct" the color balance of an original, such as a color photographic negative, by causing the overall color balance to add up to a shade near gray. This "color correction" corrects for problems with the original such as a color film balanced for daylight that was exposed in tungsten light. In general, this method produces pleasing results, creating a color balance in the print approximating the photograher's memory of the original appearance of the scene.

However, when the original scene is intentionally photographed with a narrow-band illuminant such as a green or red light, such "color correction" is not desirable, since the photographer intended the scene to have a definite green or red cast. It is the object of the present invention to provide a method for printing color photographic images whereby the print appears as the photographer intended the original scene to look.

DISCLOSURE OF THE INVENTION

The object of the present invention is acheived by detecting the presence of a scene exposed with a narrow-band illuminant in the photographic original, and printing the color photograph with no color correction if a scene exposed with a narrow-band illuminant is detected. In the preferred embodiment of the present invention, a color photographic original is scanned in three primary colors to generate a digital color image signal, three histograms representing the values of the digital color image signal in each of the three colors are generated; the standard deviations of the histograms are computed; ratios of the standard deviations are formed; and the ratios are tested against a predetermined range of values. If any of the ratios lies outside the predetermined range, a scene exposed with a narrow-band illuminant is detected.

The invention is employed in an automatic scanning color printer having means for adjusting tone scale and color balance by means of histogram modification. For wide-band illuminant scenes, both tone scale and color balance are corrected by forming a color reproduction function for each color by normalizing a sample of color values taken from the informational portion of the image in each color. This method of digital color image processing is the subject of copending U.S. application Ser. No. 730,627. For images of scenes exposed with a narrow-band illuminant, only tone scale is corrected by applying an identical color reproduction function to all three colors. The color reproduction function is generated by normalizing the histogram of a sample of color values of one of the colors.

BRIEF DESCRIPTION OF THE DRAWINGS

The invention will be described with reference to the drawings, wherein:

FIG. 9 is a graph illustrating the form of the color reproduction functions generated according to the method outlined in FIG. 8.

MODES OF CARRYING OUT THE INVENTION

Figure 1:
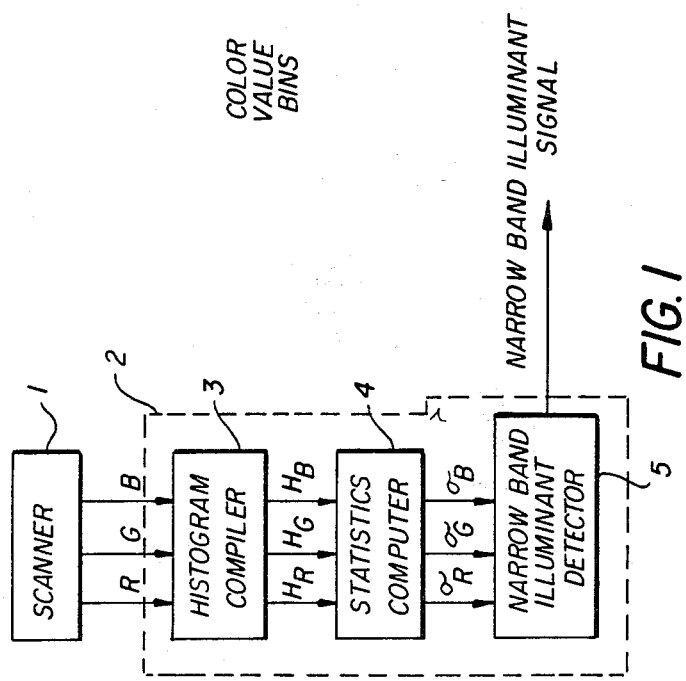
FIG. 1 is a block diagram illustrating the basic steps in detecting the image of a scene exposed with a narrow-band illuminant.

The method of detecting an image of a scene exposed with a narrow-band illuminant will first be described with reference to FIG. 1. In FIG. 1, a scanner 1 scans a color film image to produce a digital color image signal having red, green and blue color components R, G, and B. A digital computer 2 receives the digital color image signal, and is programmed to detect and signal the presence of an image of a scene that was exposed with a narrow-band illuminant. The digital computer 2 is programmed to provide a histogram compiler 3 for compiling histograms $H_R$, $H_G$, and $H_B$ of the three color components of the digital color image signal. A statistics computer 4 receives the histogram data and computes the standard deviation $\sigma_R$, $\sigma_G$, and $\sigma_B$ of the respective histograms. A narrow-band illuminant detector 5 forms the ratios of the standard deviations and generates a narrow-band illuminant signal if any of the ratios fall outside a predetermined range of values.

Although the present invention can be employed with a conventional color photographic printer having a negative scanner, it is especially useful with a scanning type color printer as described below.

Figure 2:
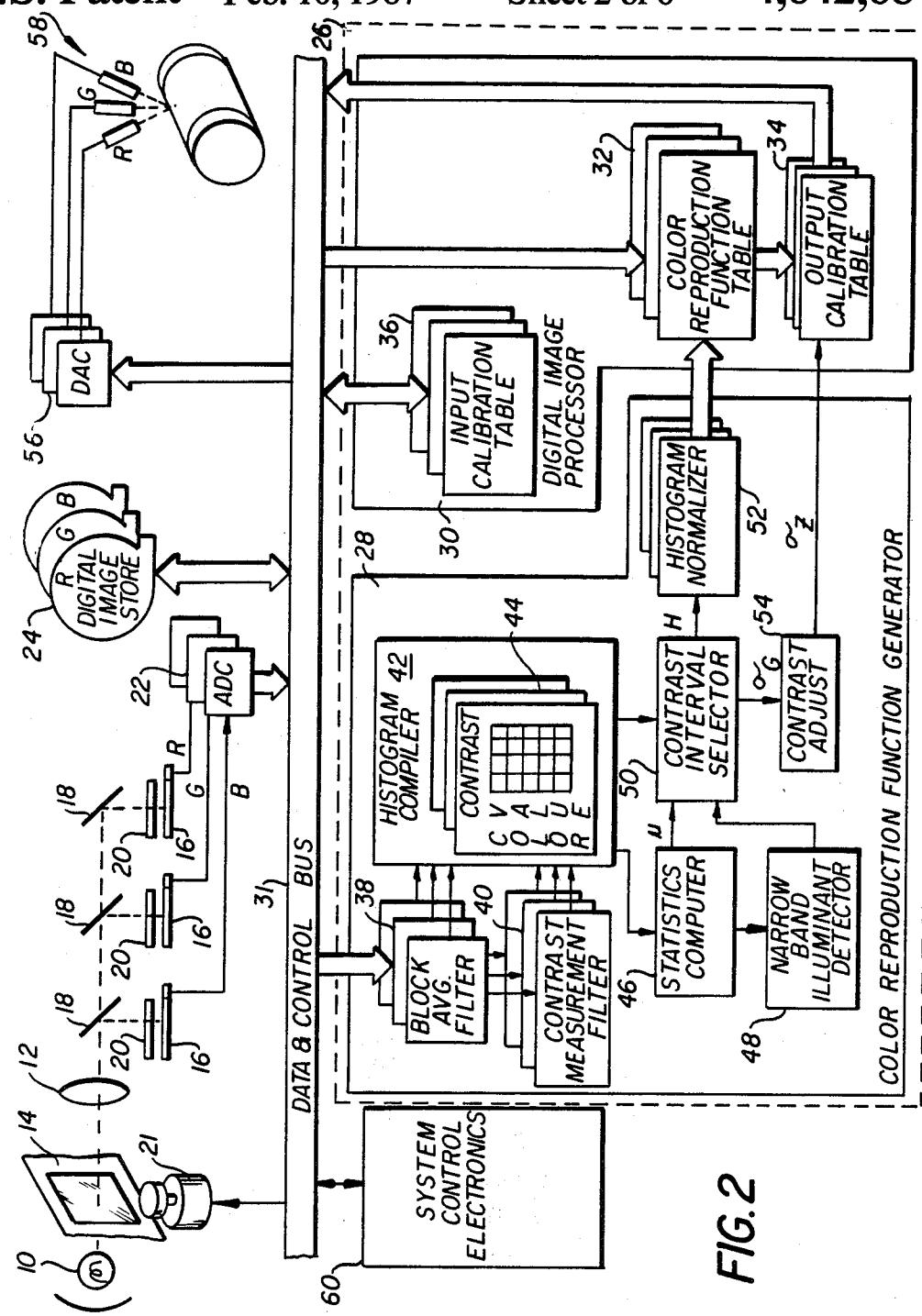
FIG. 2 is a schematic diagram, illustrating a scanning color photographic printer for carrying out the color printing method of the present invention.

Turning now to FIG. 2, an example of a scanning color photographic printer used to practice the present invention will be described. The input device includes a light source 10 and lens 12 for projecting an image of color negative film 14 onto three solid state image sensing arrays 16, such as CCD image sensors. The image is directed to the image sensing array 16 by dichroic beam splitters 18 through color trimming filters 20, to form a red, green and blue separation image on the respective image sensors. A film advance motor 21 advances the film in the printer. The image sensors 16 scan the color photographic negatives to produce three color separation signals R, G and B. The signals thus produced are supplied to analog-to-digital converters 22 that each produce an 8-bit output code representing one of 256 possible signal levels for each sample point in the three colors.

The digital color-image signals are stored in a digital image storage memory 24, such as a magnetic tape, disc, or solid state semiconductor memory. The digital color-image signals are processed in a digital computer 26. A DEC 2060 mainframe computer was used.

The digital computer 26 is programmed to include a color reproduction function generator 28 and a digital image processor 30 that applies color reproduction functions generated by color reproduction function generator 28 to the digital color image. The color reproduction function generator 28 receives the digital color image from the digital image storage device 24 via data and control bus 31 and generates a color reproduction function table 32 for each color. The color reproduction function generator 28 also generates a multiplicative constant $\sigma_z$ for adjusting the contrast of the processed image as described below and supplies the constant to three output calibration tables 34.

Prior to storing the digital image in digital image store 24, each input signal level is converted to an input color value, such as photographic density, by a known scanner calibration function. The calibration function for each color is implemented in the form of a look up table 36 in the digital image processor 30, to convert each 8-bit input value to an 8-bit value representing the color negative density at the scanning point.

The color reproduction function generator 28 includes digital filters 38 for performing a block average of the color values of the color components of the digital color image. Digital filters 40 measure the contrast of the image around each block averaged color value in each of the three colors. A histogram compiler 42 compiles the block averaged tone values from a plurality of contrast intervals in each color, in a plurality of histogram memories 44.

Figure 3:
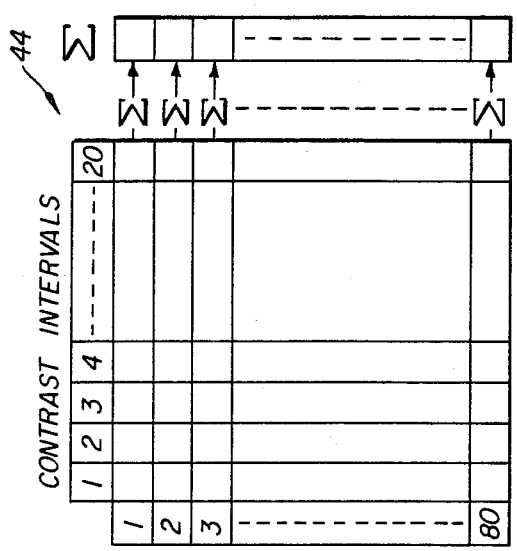
FIG. 3 is a schematic diagram showing the organization of the histogram memories used to compile the tone value histograms in the apparatus of FIG. 2.

FIG. 3 shows, in a graphic way, the organization of one of the histogram memories 44 for one of the colors. There are twenty contrast intervals having a width of 0.04 log contrast units each and one interval labeled $\Sigma$ representing the total or full distribution of color values in the color component of the signal (i.e. the sum of all the color values in contrast intervals one through twenty). The width of the contrast intervals was chosen to be approximately twice the minimum visual log contrast threshold. The 256 color values are divided into 80 density bins, for a resolution of 0.05 density units per density bin. Counts are accumulated in the appropriate density bins in the histogram memories until all of the color values from the digital color image are counted.

A statistics computer 46 in the color reproduction function generator 28 computes the statistical moments of the distributions of color values in the histogram memories 44 as described below.

A narrow-band illuminant detector 48 receives signals representing the standard deviations of the full distributions of the red, green, and blue color values from the statistics computer 46 and generates a signal representing the presence of of an image of a scene that was exposed with a narrow-band illuminant.

A contrast interval selector 50 receives the narrow-band illuminant signal from the narrow-band illuminant detector 48 and the statistical moments $\mu$ of the color value distributions from the statistics computer 46. In the absence of a narrow-band illuminant signal, the contrast interval selector 50 selects a contrast interval on the basis of the statistical moments of the distributions of color values in the contrast intervals and supplies the color value histograms H from the selected contrast interval to histogram normalizers 52.

Alternatively, if a narrow-band illuminant signal is received from narrow-band illuminant detector 48, only the full green color value distribution is provided to the histogram normalizers 52, and the color reproduction function for all three colors are generated from the full green distribution. Histogram normalizers 52 normalize the histograms from the selected contrast interval to generate the color reproduction function lookup tables 32 in digital image processor 30.

A contrast adjustment computer 54 receives the standard deviation $\sigma_G$ of the green color values in the selected contrast interval and generates a multiplicative constant $\sigma_z$ used to determine the contrast of the processed image. The multiplicative constant is provided to output calibration tables 34 in the digital image processor 30. All the processed color values in all three colors are multiplied by this same constant.

The color reproduction function lookup tables 32 relate each of the 256 possible input values in the respective colors to one of 256 possible output values. After the color reproduction function lookup tables 32 have been generated, the digital image processor 30 processes the digital image by applying the color reproduction functions to the respective color components of the digital color image. The output calibration functions are then applied to the respective color components of the processed digital color image. The processed digital color image is converted to analog form by digital-to-analog converters 56. The processed analog color signal is then applied to an output scanning device 58 to reproduce the image. The output device 58 is a drum-type scanner having red, green and blue laser light sources that are modulated by the respective analog color signals to expose a light sensitive medium such as color photographic paper. System control electronics 60 controls and coordinates the operation of input and output scanning devices and the signal processing computer 26.

The method of generating the narrow-band illuminant signal and the color reproduction function will now be described in more detail with reference to the flow charts of FIGS. 4-8.

Figure 4:
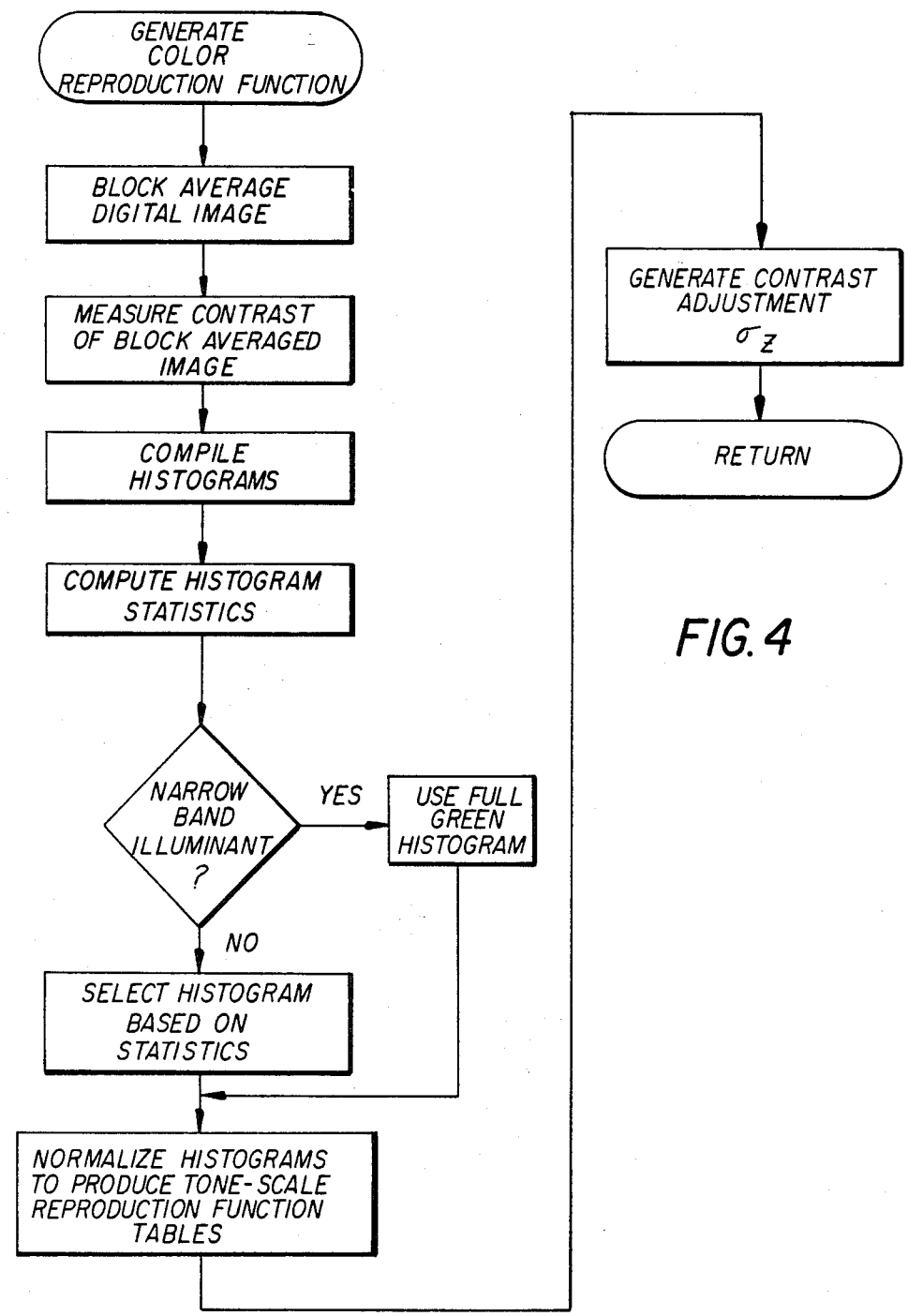
FIGS. 4–8 are flow charts illustrating the operation of the apparatus shown in FIG. 2.

Referring first to the flow chart of FIG. 4, the processing steps performed on the color digital image to generate the respective color reproduction functions will be described. All three color components are processed through these steps. First a block average of the color values of the sampled digital image is formed. This is accomplished by applying a digital filter to the digital image color values of the form:

$$\begin{bmatrix} 1 & 1 & 1 & 1 \\ 1 & 1 & 1 & 1 \\ 1 & 1 & 1 & 1 \\ 1 & 1 & 1 & 1 \end{bmatrix} / 16 \qquad (1)$$

This averaging is performed by the block average filter 38 shown in FIG. 2, to reduce the effects of film grain on the color value statistics.

Next, a digital filter representing a Laplacian operator of the form:

$$\begin{bmatrix} 0 & -1 & 0 \\ -1 & 4 & -1 \\ 0 & -1 & 0 \end{bmatrix} \qquad (2)$$

is applied to the block averaged color components of the digital image to measure the contrast of the image at each block averaged. This operation is performed by the contrast measurement filters 40 shown in FIG. 2. The Laplacian operator has the properties of exhibiting no response to uniform areas or linear gradients, and exhibits a response only to changes in gradients. The Laplacian operator works well in measuring the contrast of the image, however it is to be understood that other contrast measuring filters may be employed.

The respective histograms in each contrast interval for each color component are compiled as discussed above, and their statistics are computed. A test for an image of a scene that was exposed with a narrow-band illuminant is performed by examining the statistics of the full red, green and blue distributions. If an image of a scene that was exposed with a narrow-band illuminant is detected, as described below, the full green distribution is provided to the histogram normalizer for producing the color reproduction function table for all three colors. If an image of a scene that was exposed with a narrow-band illuminant is not detected, a contrast interval is selected on the basis of the statistical parameters of the color value distributions in the contrast interval, and the histograms of color values in the selected contrast interval are normalized to generate the respective color reproduction function for each color.

Figures 5, 6:
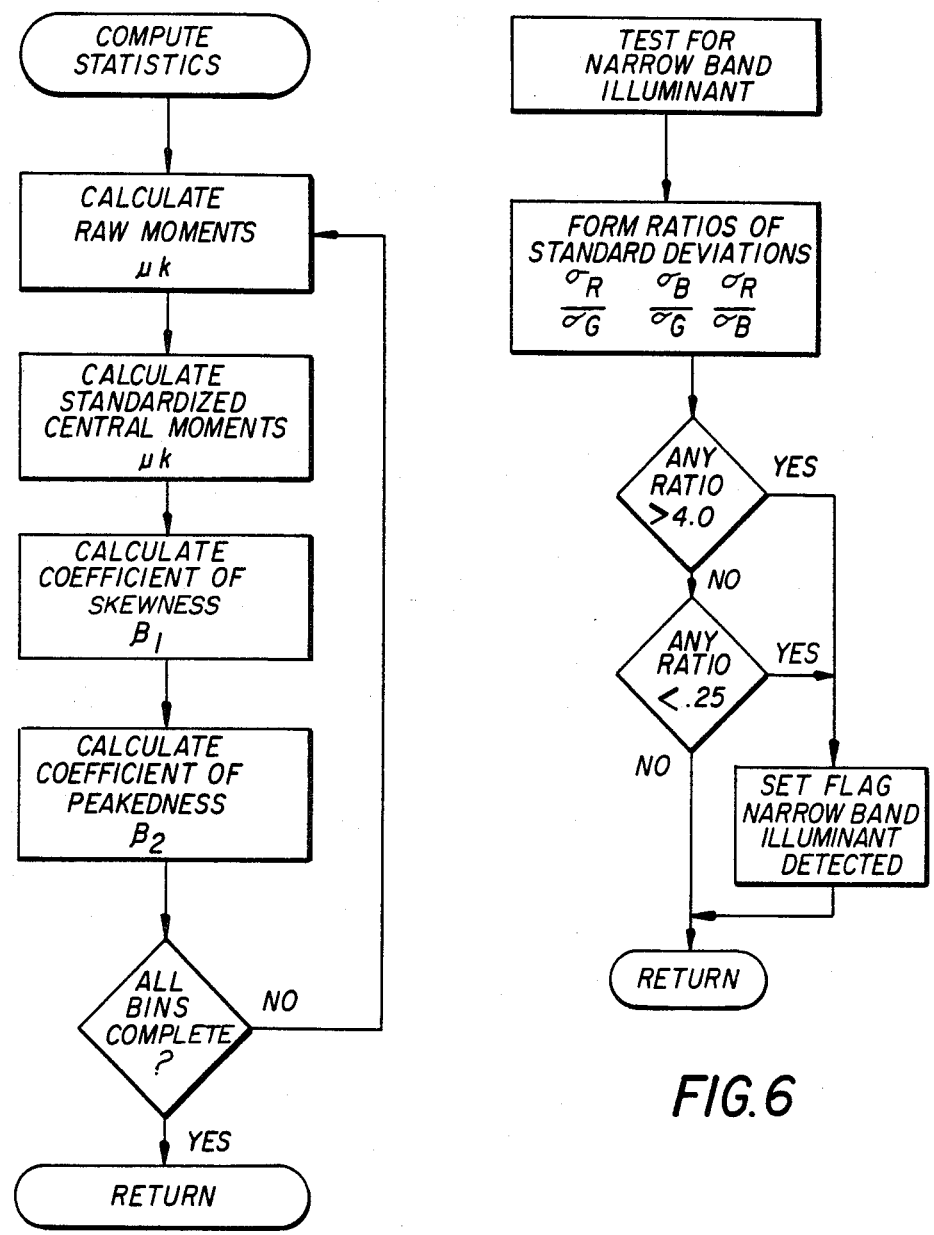

FIG. 5 is a flow chart showing the steps involved in compiling the histogram statistics for each contrast interval and the full color value distribution in each color. The raw moments $\mu_k$ taken about the mean are computed as follows:

$$\mu_k = \frac{1}{N}\left(\sum_{i=1}^{N}(x_i - \bar{x})^k\right) \quad (3)$$

where
N is the total number of samples in the contrast interval;
$x_i$ is a color value; and
$\bar{x}$ is the mean color value.

The standardized central moments $\mu'_k$ are calculated as follows:

$$\mu'_k = \frac{\mu_k}{\sigma^k}, \text{ where } \sigma = \sqrt{\mu_2} \quad (4)$$

The coefficient of symmetry (skewness) for each distribution is then represented as $$\beta_1 = (\mu'_3)^2 \quad (5)$$

and the coefficient of peakedness (kurtosis plus 3) is represented as $$\beta_2 = \mu'_4 \quad (6)$$

Referring now to FIG. 6, the steps involved in determining the presence of an image of a scene that was exposed with a narrow-band illuminant and in selecting the contrast interval according to the invention will be described. First, the ratios of the standard deviations $\sigma$ of the full red, green and blue tone value distributions are formed as follows $$\sigma_R/\sigma_G, \ \sigma_B/\sigma_G, \ \sigma_R/\sigma_B$$

where $\sigma_R$ is the standard deviation of the full red distribution etc.

The ratios are then tested to determine if any of the ratios exceed 4.0 and/or are less than 0.25, thereby indicating the presence of an image of a scene that was exposed with a narrow-band illuminant. If such an image is indicated, the green distribution for the whole scene is provided to the histogram normalizers and the color reproduction function resulting from normalizing the full green distribution is employed for all three colors.

If an image of a scene that was exposed with a narrow-band illuminant is not indicated, one of the contrast intervals is selected, and the respective red, green and blue color value distributions therein are provided to the histogram normalizers 52.

Figures 7, 8:
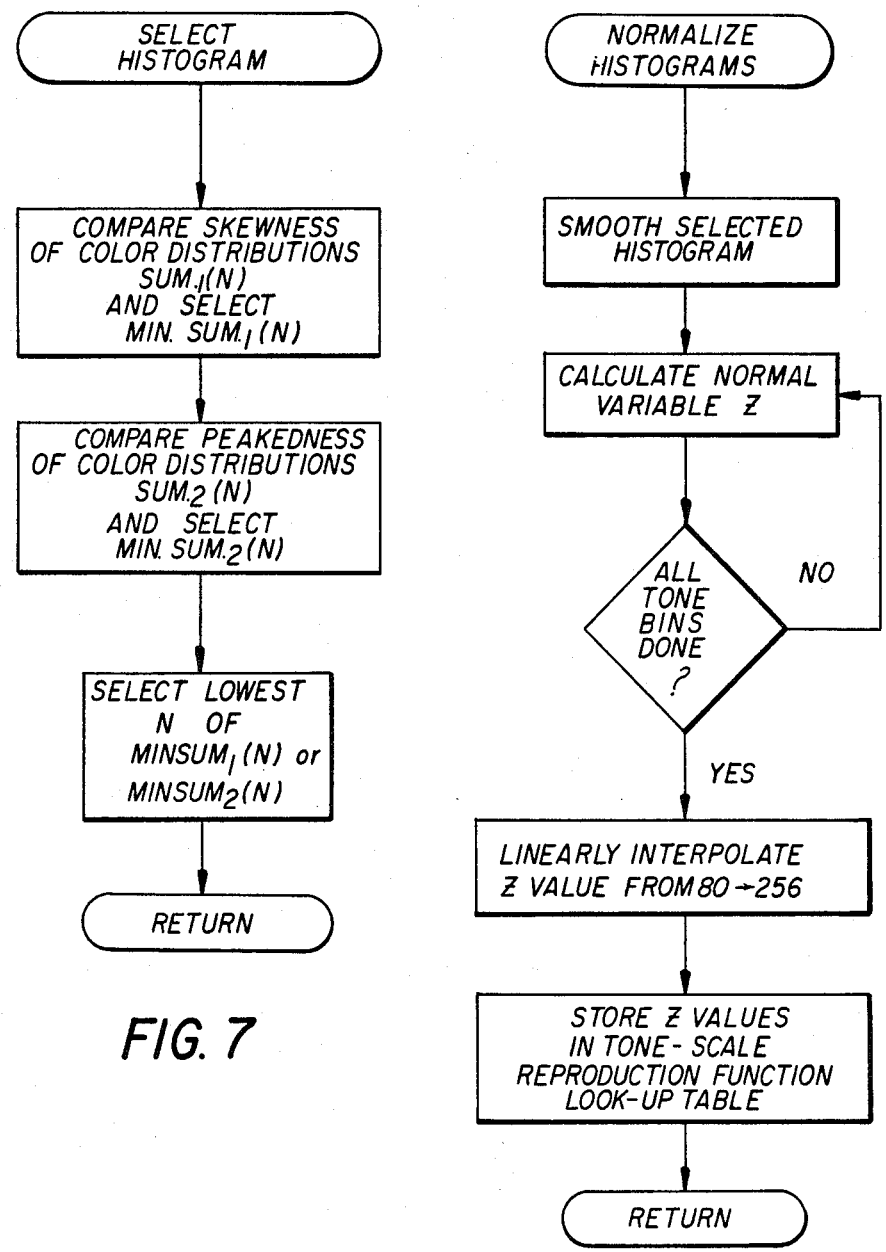

Referring to FIG. 7, the contrast interval selection criterion for an image of a scene exposed with a wideband illuminant involves, for example, the similarity of the shapes of the three color value distributions in the contrast interval. The selection criterion involves comparing the skewness of the color value distributions in each of the contrast intervals as follows:

$$SUM_1(N) = |\beta_{1R} - \beta_{1G}| + |\beta_{1B} - \beta_{1G}| + |\beta_{1R} - \beta_{1B}| \quad (7)$$

where $SUM_1(N)$ is a measure of the difference in skewness between the three color value distributions in the Nth contrast interval. The contrast interval having the most similar distribution, i.e. the lowest value of $SUM_1(N)$ is identified.

Next, the peakedness of the three color value distributions in each contrast interval is compared as follows:

$$SUM_2(N) = |\beta_{2R} - \beta_{2G}| + |\beta_{2B} - \beta_{2G}| + |\beta_{2R} - \beta_{2B}| \quad (8)$$

where $SUM_2(N)$ is a measure of difference in peakedness between the three color value distributions in the Nth contrast interval. The contrast interval having the most similar distributions, i.e. the lowest value of $SUM_2(N)$ is identified.

Finally, the lowest contrast interval (i.e. the interval representing the lowest contrast) between the two identified contrast intervals is selected.

Turning now to FIG. 8, the steps involved in normalizing the color histograms in the selected contrast interval to generate the color reproduction functions will be described. To normalize a histogram, the standard normal variate Z for all 80 tone bins in the selected contrast interval, or in the full green distribution in the event of a narrow-band illuminant, is computed. First however, an average smoothing operation is performed on the selected color value distribution to remove any spikes. The smoothing is performed on the counts in 3 consecutive color value bins as follows:

$$h_i = \frac{1}{3}(h'_{i-1} + h'_i + h'_{i+1}) \quad (9)$$

where
$h'_i$ is the count in bin i and
$h_i$ is the smoothed value.

Next, the standard normal variate Z is calculated for the smoothed values of the histogram as follows (from *Approximations for Digital Computers*, Hastings C., Princeton Univ. Press.):

$$Z_j = t_j - \frac{a_0 + a_1 t_j}{1 + b_1 t_j + b_2 t_j^2} \quad (10)$$

where

-continued $$t_j = \sqrt{\ln(1/P_j^2)}$$

$a_0 = 2.30753$
$a_1 = 0.27061$
$b_1 = .99229$
$b_2 = .04481$

The probability $P_j$ for each of the 80 bins is given by $$P_j = \frac{\sum_{i=1}^{j} h_i}{\sum_{i=1}^{80} h_i} \qquad (11)$$

where $h_i$ are smoothed counts in the ith color value bin, and $j=1$ to 80.

Next, the Z values are linearly interpolated from 80 to 256 values to provide a Z value for each of the 256 possible scanner inputs represented by the 8-bit digital code. Finally the 256 Z values are stored in the color reproduction function lookup table 32. This process is applied to each of the three samples of color values in the selected contrast interval, or to the full green distribution if an image of a scene that was exposed with a narrow-band illuminant is detected.

FIG. 9 is a graph showing the form of the color reproduction functions produced by normalizing the samples of color values. In the lower right quadrant of the graph, a curve labeled 70 represents a standard normal distribution showing the probability of the occurrence of a value plotted against the standard normal variate Z. In the upper left quadrant of the graph, the curve labeled 72 represents the sample of color values from the image, plotted against relative probability of occurrence. The central ordinate of the graph relates the relative probability $P_j$ of the color value distribution to Z values according to the relationship defined by equation 10. The color reproduction curve, labeled 74, maps the Z values on the ordinate to the same Z values on the abcissa. A color value scale on the far upper right of the diagram, congruent to the color value scale on the far left, shows how the color reproduction function relates color values to Z values.

After the three color reproduction function lookup tables are generated, all of the color values of the image are processed by applying the respective color reproduction functions to them. At this point, the processed color values from the image are dimensionless quantities representing the Z values.

To recover the processed image, these dimensionless quantities are given magnitudes with respect to the original image and the output medium by multiplying the Z values with a multiplier $\sigma_z$ that adjusts the contrast of the processed image. To adjust the color balance of the image, a constant term is added to each of the three color values. The additive constant term relates the Z values in each color to the density of the output medium for the respective color, thereby causing equal Z values in all three colors to be reproduced as a shade of gray.

Appropriate values for the multiplier $\sigma_z$ that adjusts contrast and the additive constants that determine the color balance of the processed image are determined as follows. The multiplier is computed based on the statistics of the green color values alone, but is applied to all three colors. The intrinsic contrast of natural scenes can be quantified in terms of the standard deviation of log reflectance of edges in the scene or the density representation of these log reflectances in the photographic image. On the average the approximate relationship between the two is given by:

$$\sigma_D = \overline{G} \cdot \sigma_R \qquad (12)$$

where:

$\overline{G}$ = average gradient of the photographic film (relates $\sigma_R$ to some specific reproduction medium contrast)
$\sigma_R$ = standard deviation of log reflectance based on a large number of original scenes
$\sigma_D$ = standard deviation of density Typical values for $\sigma_R$ and $\overline{G}$ for color negative photographic film are 0.31 and 0.68 respectively, such that $\sigma_D$ is 0.21. Departures from this average contrast must be compensated. A general equation may be stated as:

$$\sigma_z = m \cdot f(\sigma_s) + b \qquad (13)$$

where:

$\sigma_s$ = individual scene standard deviation, from the selected contrast interval
m and b are system dependent constants and
$f(\sigma_s)$ is some function of the sample standard deviation
$\sigma_z$ = the multiplier applied to the values obtained from the color reproduction function.

A simple and satisfactory implementation is obtained from:

$$b = \sigma_D \cdot (1.0 - m) \qquad (14)$$

$$\sigma_z = m \cdot \sigma_s + b \qquad (15)$$

where:

m is typically between 0.6 and 0.8.

The sign of $\sigma_z$ is positive if the reproduction has the same polarity as the original image (negative-to-negative or positive-to-positive). If the reproduction has a polarity of an opposite sense with respect to the original, e.g., negative-to-positive, then the sign of $\sigma_z$ is negative.

For example, if a color negative image is to be printed directly onto color photographic paper, the log exposure for the desired mean paper density for each color is simply added to the translated, contrast adjusted values of the respective colors. The complete calculation is given by:

$$\log E_{ZD} = -\sigma_z \cdot Z_D + \log E_A \qquad (16)$$

where:

$\log E_A$ = log exposure required to obtain the aim paper density
$Z_D$ = translated Z value for some input density in the original image
$\log E_{ZD}$ = log exposure for $Z_D$.

INDUSTRIAL APPLICABILITY AND ADVANTAGES

The method of detecting and treating images of scenes exposed with a narrow-band illuminant according to the present invention is useful in the graphic arts and color photographic printing fields to automatically detect and adjust the printing conditions for such scenes. The method is advantageous in that a greater percentage of aesthetically pleasing processed images are produced automatically, without the need for operator intervention, than by the methods of the prior art. The invention is especially useful with scanning color photographic printers employing digital image processing of the type that includes statistical modification of the color value distributions, since the statistics necessary for determining the presence of an image of a scene that was exposed with a narrow-band illuminant are readily available, and the adjustment to the image is easily implemented.

I claim:

1. A method of printing a color photographic original to produce a color photograph, characterized by the steps of: detecting if the color photographic original was exposed with a narrow-band illuminant, and printing the color photographic original with no color correction if it is detected that said color photographic original was exposed with a narrow-band illuminant.

2. The method claimed in claim 1, further including the step of scanning said color photographic original to generate a distribution of color values for each of three primary colors, and wherein said detecting step includes the steps of: computing the standard deviation of each of the color value distributions, forming ratios of the standard deviations, comparing said ratios with a predetermined range of values, and generating a narrow-band illuminant detection signal when at least one of said ratios lies outside said predetermined range.

3. The method claimed in claim 2, wherein said color values are photographic densities and said predetermined range of values is 0.25 to 4.0.

4. A method of detecting a color image of a scene illuminated by a narrow-band illuminant and printing the color image to produce a color photograph, characterized by the steps of: scanning the color image to generate a distribution of color values for each of three primary colors, computing the standard deviation of each of the color value distributions, forming ratios of the standard deviations, and printing the color image with no color correction when at least one of the ratios of the standard deviations is greater than a first predetermined constant or less than a second predetermined constant.

5. The method claimed in claim 4, wherein the color values are photographic densities and wherein the first predetermined constant is 4.0 and the second predetermined constant is 0.25.

6. An apparatus for processing a digital color image of a scene, comprising means responsive to said digital color image of said scene for detecting if said scene was illuminated by a narrow-band illuminant, said detecting means comprising:

means responsive to said digital color image for generating three first signals, each said first signal representing the standard deviation of a distribution of color values of the digital image for a different one of three primary colors, means responsive to said first signals for generating second signals representing ratios of said standard deviations, and means responsive to said second signals for forming a third signal indicating that said scene was illuminated by a narrow-band illuminant when any one of said ratios exceeds a first predetermined constant or falls below a second predetermined constant.

7. The apparatus claimed in claim 6, wherein said color values are photographic densities and wherein the first predetermined constant is 4.0 and the second predetermined constant is 0.25.

8. An apparatus for processing a digital color image of a scene, said digital color image comprising color values for three primary color components, said apparatus comprising:

means responsive to said digital color image for detecting if said scene was illuminated by a narrow-band illuminant, said detecting means comprising:

means for compiling a plurality of histograms, each said histogram representing a distribution of color values for each of the three primary color components of the digital color image;

means for generating a plurality of first signals, each said first signal representing the standard deviation of the distribution of color values in a different one of said histograms;

means responsive to said first signals for generating second signals representing ratios of said standard deviations; and means responsive to said second signals for generating a narrow-band illuminant detection signal when at least one of said ratios is outside a predetermined range of values;

said apparatus further comprising:

means for generating a color reproduction function for each of said three primary color components of the digital color image, said color reproduction function generating means being responsive to the presence of said narrow-band illuminant detection signal so as to generate one color reproduction function by normalizing one of said histograms of color values, said one color reproduction function being used as a color reproduction function for all of said three primary color components of the digital color image, and said generating means being responsive to the absence of said narrow-band illuminant detection signal to generate a color reproduction function for each of said three primary color components by normalizing a sample of color values for each respective color component; and means for processing color values for each color component of said digital color image with the respective color reproduction function.

9. The apparatus claimed in claim 8, wherein said sample of color values for each respective color component is selected from one of a plurality of contrast intervals on the basis of the skewness and peakedness of histograms representing distributions of color values in said contrast intervals.

* * * * *